United States Patent

(12) United States Patent
Ozue

(10) Patent No.: US 6,522,506 B1
(45) Date of Patent: Feb. 18, 2003

(54) APPARATUS AND METHOD FOR VARIABLY PROJECTING A MAGNETIC HEAD ELEMENT IN A MAGNETIC HEAD UNIT

(75) Inventor: Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/544,165

(22) Filed: Apr. 6, 2000

(30) Foreign Application Priority Data

Apr. 9, 1999 (JP) .......................................... 11-103236

(51) Int. Cl.[7] .................................................. G11B 5/56
(52) U.S. Cl. ................................................... 360/291.9
(58) Field of Search .............................. 360/291.9, 292, 360/291.6

(56) References Cited

U.S. PATENT DOCUMENTS 3,775,567 A * 11/1973 Bruck
4,251,838 A * 2/1981 Saito
4,722,015 A * 1/1988 Ushiro
5,159,510 A * 10/1992 Saito
5,173,820 A * 12/1992 Yoneda
5,223,992 A * 6/1993 Mitsuhashi

* cited by examiner

Primary Examiner—Craig A. Renner
(74) Attorney, Agent, or Firm—Sonnenschein, Nath & Rosenthal

(57) ABSTRACT

An apparatus and method for a magnetic head unit which keeps good contact between a magnetic head element and a magnetic tape to effectively suppress wear of the magnetic head element and damage to the magnetic tape, and which helps obtain a high output. The projection of an edge portion of the magnetic head element from an outer peripheral plane of the magnetic head unit is variable, such as by a piezoelectric ceramic.

8 Claims, 8 Drawing Sheets

POSITION WHERE COIL OF PULSE GENERATOR APPROACHES TO MAGNET

ONE TURN OF ROTARY DRUM

ONE TURN OF ROTARY DRUM

ONE TURN OF ROTARY DRUM

SLIDING STARTING SIDE

SLIDING ENDING SIDE

ONE TURN OF ROTARY DRUM

APPARATUS AND METHOD FOR VARIABLY PROJECTING A MAGNETIC HEAD ELEMENT IN A MAGNETIC HEAD UNIT

RELATED APPLICATION DATA

The present application claims priority to Japanese Application No. 11-103236 filed Apr. 9, 1999 which application is incorporated herein by reference to the extent permitted by law.

BACKGROUND OF THE INVENTION

1. Field of the Invention

The present invention relates to a magnetic head unit having a rotary drum in which a magnetic head element is disposed and to a method for writing or reading signals to/from a magnetic tape by using the magnetic head unit.

2. Description of the Related Art

Hitherto, there has been proposed a helical scan type signal recording/reproducing method for recording/reproducing signals to/from a magnetic tape by obliquely sliding a magnetic head element mounted in a rotary drum on the running magnetic tape.

Because this helical scan method is a method for writing or reading signals by sliding the magnetic head element on the running magnetic tape at high speed, it has merits that the relative sliding speed of the magnetic tape and the magnetic head element is fast and that a high data transfer rate may be obtained.

The magnetic head unit for writing or reading signals to/from the magnetic tape by means of this helical scan method comprises a unit body whose outer shape is approximately cylindrical and the magnetic head element attached to the rotary drum side of the unit body. The magnetic head element is attached to a head base such that its edge portion is fixed to the rotary drum so that it projects somewhat out of the peripheral plane of the unit body. Meanwhile, the magnetic tape is wound around the peripheral plane of the unit body while slanting by a predetermined slant angle with respect to the direction which crosses at right angles with an axis of rotation of the rotary drum, e.g., by a winding angle of 180 degrees.

The magnetic head element attached to the rotary drum slides aslant on the magnetic tape, thus writing or reading signals to/from the magnetic tape, when the rotary drum is rotated while winding the magnetic tape around the peripheral plane of the unit body.

By the way, the condition of contact between the magnetic head element of the magnetic head unit and the magnetic tape depends on a projection of the edge portion of the magnetic head element out of the peripheral plane of the unit body. Then, when the edge portion of the magnetic head element projects too much out of the peripheral plane of the unit body, the pressure of contact of the magnetic head element to the magnetic tape becomes excessive, thus becoming a factor of increasing the wear of the magnetic head element or of damaging the magnetic tape. When the edge portion of the magnetic head element projects too little out of the peripheral plane of the unit body on the contrary, the magnetic head element does not touch the magnetic tape well, thus causing a large spacing loss produced by a gap between the magnetic head element and the magnetic tape to decrease the output.

SUMMARY OF THE INVENTION

By the way, the adoption of a magneto-resistance effect type magnetic head element as a reproducing magnetic head element has been discussed in order to deal with the recent requirement for recording at high density by the helical scan method magnetic head unit.

Although the magneto-resistance effect type magnetic head element has a merit that it allows a high reproducing output to be obtained as compared to an inductive type magnetic head element which has been used in general as a reproducing magnetic head element in the helical scan method magnetic head unit, it has had a problem that it is very liable to wear when it is slid on a magnetic tape at high speed.

Then, in the magnetic head unit described above, the magneto-resistance effect type magnetic head element must be attached to the rotary drum more carefully and the projection of the edge portion of the magnetic head element from the peripheral plane of the unit body must be adjusted at higher precision to minimize the wear of the magnetic head element when it is adopted as the reproducing magnetic head element.

However, it is very difficult and cumbersome to adjust the projection of the edge portion of the magnetic head element out of the peripheral plane of the unit body in the stage of attaching the magnetic head element to the rotary drum, as described above.

Further, even if the magnetic head element is attached to the rotary drum such that the projection of the edge portion of the magnetic head element out of the peripheral plane of the unit body is optimized, it is unable to avoid the advancement of the wear of the magnetic head element which occurs along its use. Then, when the magnetic head element is attached fixedly to the rotary drum like the magnetic head unit described above, the projection of the edge portion of the magnetic head element out of the peripheral plane of the unit body changes and the touch of the magnetic head element to the magnetic tape may not be kept well when the wear of the magnetic head element advances.

Because the magnetic tape is wound aslant around the peripheral plane of the unit body in the magnetic head unit described above, the ratio of a part of the magnetic tape wound around the rotary drum to a part of the magnetic tape wound around the stationary drum differs depending on the position. For instance, the magnetic tape is wound more to the rotary drum at the tape advancing side of the unit body, i.e., at the side where the magnetic tape is started to be wound, and the magnetic tape is wound more to the stationary drum at the side of the unit body where the tape is released.

Then, in the magnetic head unit, air film is created between the rotary drum and the magnetic tape as the rotary drum is rotated, and the distance between the magnetic tape and the peripheral plane of the unit body differs corresponding to the rate of the part of the magnetic tape wound to the rotary drum. That is, the distance of the magnetic tape at the part wound more to the rotary drum from the peripheral plane of the unit body is large than the magnetic tape of the part wound more to the stationary drum. Accordingly, when the magnetic head element is fixed to the rotary drum like the magnetic head unit described above, the pressure of contact of the magnetic head element to the magnetic tape changes depending on the position of the magnetic tape where the magnetic head element slides, i.e., whether the magnetic head element is located at the side where the magnetic tape advances or at the side where the magnetic tape is leased, thus causing nonuniformity of the touch in some cases.

The present invention has been made in view of the problems as described above and provides a magnetic head unit which is arranged so as to effectively suppress the wear of the magnetic head element and the damage of the magnetic tape and to be able to obtain a high output by keeping the touch of a magnetic head element to a magnetic tape well, and a method for writing or reading signals by using the magnetic head unit.

According to one aspect of the invention, the magnetic head unit comprises an approximately cylindrical unit body having a stationary drum and a rotary drum turnably provided with respect to the stationary drum; a magnetic head element in which an edge portion thereof is disposed in the rotary drum side so as to face to the outside from the peripheral plane of the unit body; and head projection regulating means for varying a projection of the edge portion of the magnetic head element out of the peripheral plane of the unit body.

In this magnetic head unit, the unit body has the rotary drum and the stationary drum and is formed approximately into the cylindrical shape as a whole. The rotary drum is turnable with respect to the stationary drum.

The magnetic head element is disposed on the rotary drum side of the unit body. The magnetic head element is provided such that the edge portion thereof faces to the outside from the peripheral plane of the unit body. When the rotary drum is rotated, the magnetic head element slides on a magnetic tape wound around the peripheral plane of the unit body, thus writing or reading signals to/from the magnetic tape.

In the magnetic head unit, the head projection regulating means is configured so as to be able to change the projection of the edge portion of the magnetic head element out of the peripheral plane of the unit body. The head projection regulating means is composed of a piezoelectric ceramic provided between the rotary drum and the magnetic head element for example.

The magnetic head unit can keep the touch of the magnetic head element to the magnetic tape always well as the head projection regulating means changes the projection of the edge portion of the magnetic head element out of the peripheral plane of the unit body in correspondence to the state of the magnetic head element and to the fluctuation of distance between the magnetic tape and the peripheral plane of the unit body.

Preferably, the head projection regulating means changes the projection of the edge portion of the magnetic head element in synchronism with the rotation of the rotary drum so that the projection of the edge portion of the magnetic head element differs at the sliding starting side where the magnetic head element starts to slide with respect to a magnetic tape which runs along the peripheral plane of the unit body and at the sliding ending side where the magnetic head element ends to slide with respect to the magnetic tape.

The touch of the magnetic head element to the magnetic tape may be kept at the good condition by the head projection regulating means, even when the distance between the magnetic tape and the peripheral plane of the unit body differs at the sliding starting side and the sliding ending side in correspondence to the ratio of the part of the magnetic tape wound around the rotary drum for example, by changing the projection of the edge portion of the magnetic head element in synchronism with the rotation of the rotary drum so that the projection of the edge portion of the magnetic head element differs at the sliding starting side and the sliding ending side.

Further, driving electric power for driving the head projection regulating means is preferably transmitted in AC via a non-contact type signal transmitter provided between the stationary drum and the rotary drum for transmitting signals between the magnetic head element disposed on the rotary drum side and the stationary drum side.

Then, no transmitter needs to be provided anew for transmitting the driving electric power for driving the head projection regulating means, by transmitting the driving electric power for driving the head projection regulating means via the non-contact type signal transmitter provided for transmitting signals between the magnetic head element disposed on the rotary drum side and the stationary drum side, and the structure may be simplified.

Still more, a magneto-resistance effect type magnetic head element is preferably used as the magnetic-head element in the magnetic head unit. Thereby, the magnetic head unit can improve the reproduced output. It is noted that the driving electric power for driving the magneto-resistance effect type magnetic head element is preferably transmitted in AC via the non-contact type signal transmitter described above. Thereby, the structure of the magnetic head unit may be simplified.

According to another aspect of the invention, in a method for writing or reading signals to/from a magnetic tape by sliding a magnetic head element whose edge portion is disposed on the rotary drum side so as to face to the outside from the peripheral plane of an approximately cylindrical magnetic head unit by running the magnetic tape along the peripheral plane of the magnetic head element having a stationary drum and a rotary drum turnably provided with respect to the stationary drum and by rotating the rotary drum, the method is characterized in that signals are written/read to/from the magnetic tape while changing the projection of the edge portion of the magnetic head element from the peripheral plane of the magnetic head unit in synchronism with the rotation of the rotary drum.

According to this method for writing or reading signals, the projection of the edge portion of the magnetic head element out of the peripheral plane of the magnetic head unit is changed in synchronism with the rotation of the rotary drum, so that the touch of the magnetic head element to the magnetic tape may be kept always at good condition and the signals may be appropriately written/read to/from the magnetic tape even when the distance between the magnetic tape and the peripheral plane of the unit body fluctuates due to the rotation of the rotary drum.

It is noted that in this method for writing or reading signals, the projection of the edge portion of the magnetic head element is changed in synchronism with the rotation of the rotary drum so that the projection of the edge portion of the magnetic head element changes at the sliding starting side where the magnetic head element starts to slide with respect to the magnetic tape and the sliding ending side where the magnetic head element ends to slide with respect to the magnetic tape. Thereby, the touch of the magnetic head element to the magnetic tape may be kept at good condition and the signals may be written/read to/from the magnetic tape even when the distance between the magnetic tape and the peripheral plane of the unit body differs at the sliding starting side and the sliding ending side corresponding to the ratio of the part of the magnetic tape wound around the rotary drum.

Further, in this method for writing or reading signals, it is desirable to transmit the driving electric power for changing the projection of the edge portion of the magnetic head element in AC via a non-contact type signal transmitter for transmitting signals between the magnetic head element disposed on the rotary drum side of the magnetic head unit and the stationary drum side.

Then, no transmitter needs to be provided anew for transmitting the driving electric power for changing the projection of the edge portion of the magnetic head element, by transmitting the driving electric power for changing the projection of the edge portion of the magnetic head element by the non-contact type signal transmitter provided to transmit signals between the magnetic head element disposed on the rotary drum side and the stationary drum side, and the structure of the magnetic head unit may be simplified.

In this method for writing or reading signals, it is desirable to use a magneto-resistance effect type magnetic head element is used as the magnetic head element. Thereby, the reproduced output may be improved. It is noted that it is desirable to transmit the driving electric power for driving the magneto-resistance effect type magnetic head element in AC via a non-contact type signal transmitter described above. Thereby, the structure of the magnetic head unit may be simplified.

The specific nature of the invention, as well as other objects, uses and advantages thereof, will clearly appear from the following description and from the accompanying drawings.

BRIEF DESCRIPTION OF THE DRAWINGS

FIGS. 5A and 5B are enlarged view of a part B in FIG. 3, wherein FIG. 5A is a section view showing the state when the piezoelectric ceramic has contracted and FIG. 5B shows the state in which the piezoelectric ceramic has expanded;

FIGS. 13A and 13B are enlarged views of the main part of another magnetic head unit of the invention, wherein FIG. 13A is a section view showing the state in which the piezoelectric ceramic has contracted and FIG. 13B shows the state in which the piezoelectric ceramic has expanded.

DESCRIPTION OF THE PREFERRED EMBODIMENTS

An embodiment of the present invention will be explained in detail below with reference to the drawings.

Figure 1:
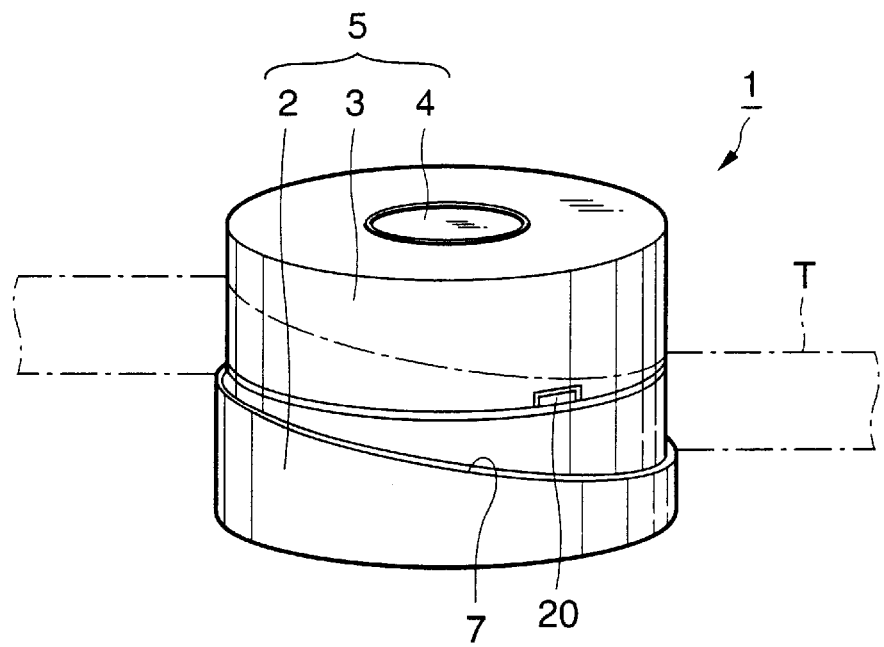
FIG. 1 is a perspective view showing one example of a magnetic head unit according to the present invention.
Figure 2:
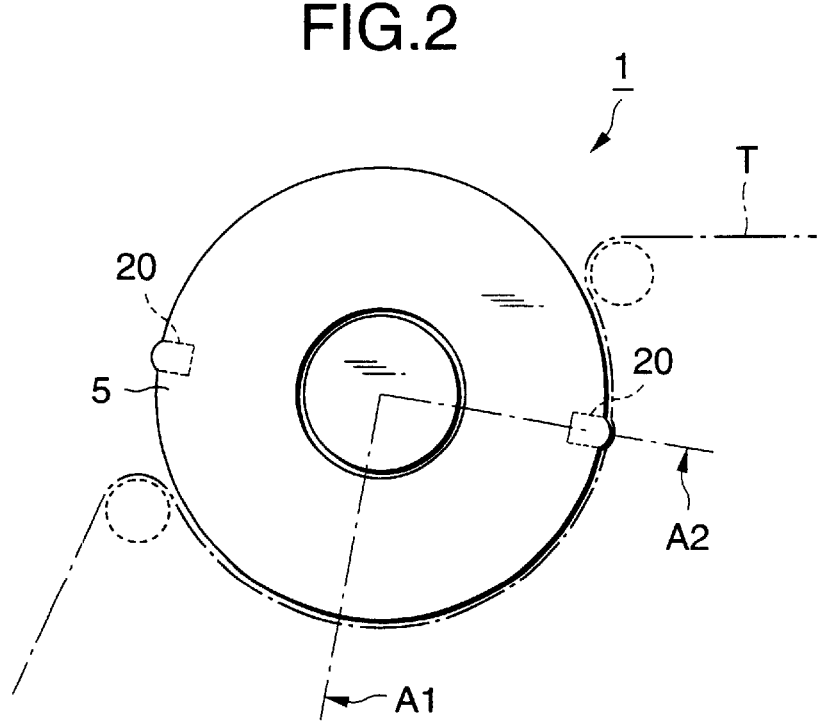
FIG. 2 is a plan view of the magnetic head unit.
Figure 3:
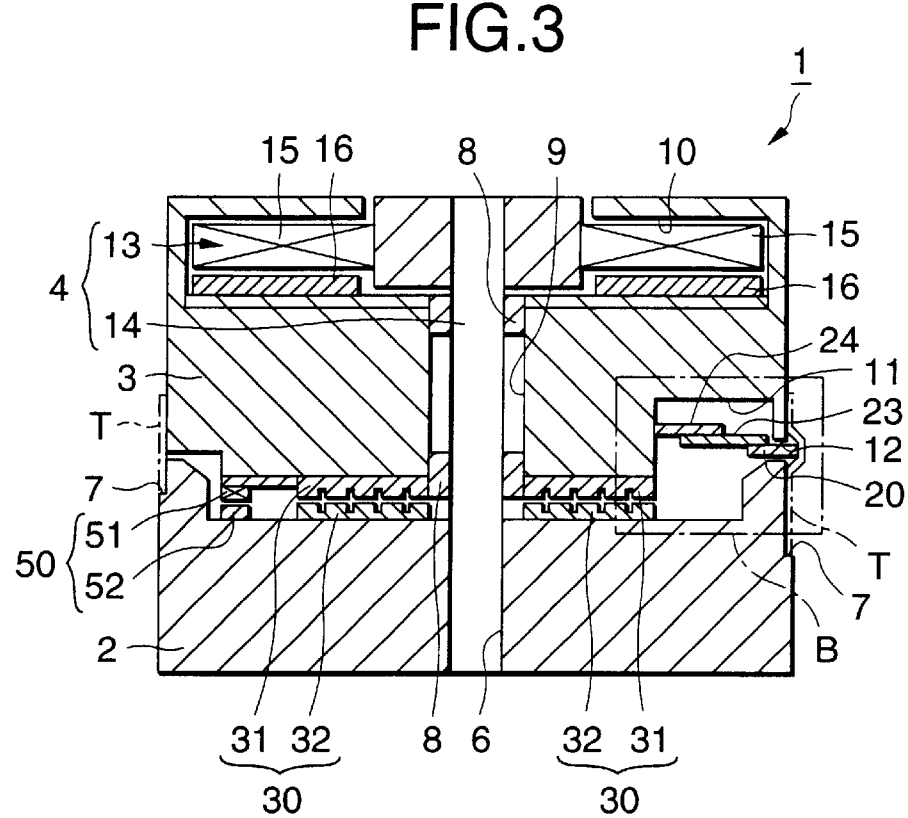
FIG. 3 is a longitudinal section view of the magnetic head unit along a line A1–A2 in FIG. 2.

FIGS. 1 through 3 show one example of a magnetic head unit to which the present invention is applied. FIG. 1 is a perspective view of the magnetic head unit 1, FIG. 2 is a plan view of the magnetic head unit 1 and FIG. 3 is a section view along a line A1–A2 in FIG. 2.

The magnetic head unit 1 is used in a recording/reproducing apparatus constructed so as to record/reproduce signals to/from a magnetic tape T by the helical scan method. It writes signals to the magnetic tape T by sliding a magnetic head element on a recording plane of the magnetic tape T which is guided by a tape running system and runs along a predetermined path within the recording/reproducing apparatus or to read signals written to the magnetic tape T by sliding the magnetic head element on the recording plane of the magnetic tape T to which the signals has been written.

As shown in FIGS. 1 through 3, the magnetic head unit 1 comprises an unit body 5 having a stationary drum 2 fixedly provided within the recording/reproducing apparatus, a rotary drum 3 coaxially provided with the stationary drum 2 and a motor 4 for turning the rotary drum 3. The unit body 5 is formed into an approximately cylindrical shape as a whole.

The stationary drum 2 is formed approximately into the shape of a disk having a predetermined thickness by a metallic material such as aluminum. A center hole 6 for inserting a shaft portion of the motor 4 is provided at the center part of the drum 2. Provided at the outer peripheral plane of the stationary drum 2 is a tape guide groove 7 for guiding the magnetic tape T around the outer peripheral plane of the unit body 5 to maintain its position. The tape guide groove 7 is formed aslant with respect to the direction vertical to the center axis of the stationary drum 2 by a predetermined angle. The magnetic tape T is wound around the peripheral plane of the unit body 5 a slant in the state in which the lower edge portion thereof is supported by the tape guide groove 7 provided at the peripheral plane of the stationary drum 2.

The rotary drum 3 is also formed approximately into the shape of a disk having a predetermined thickness by a metallic material such as aluminum. A center hole 9 for inserting the shaft portion of the motor 4 by a bearing 8 is also provided at the center thereof. A motor storage section 10 for storing a main part 13 of the motor 4 is provided at the upper end side of the rotary drum 3. A head storage section 11 is provided at the lower end side of the rotary drum 3, for storing a magnetic head element 20, attached to the rotary drum 3, so that the edge portion thereof faces to the peripheral plane of the unit body 5. A window 12 for causing the edge portion of the magnetic head element 20 to face to the outside from the peripheral plane of the unit body 5 is provided so as to be open at the peripheral plane side of the head storage section 11.

The motor 4 comprises the motor main body 13 and the shaft portion 14. The motor main body section 13 is stored in the motor storage section 10 provided at the upper end side of the rotary drum 3 and the shaft portion 14 is inserted through the center hole 9 of the rotary drum 3 and the center hole 6 of the stationary drum 2. Thereby, the stationary drum 2 and the rotary drum 3 are connected via the shaft portion 14 of the motor 4. Here, the shaft portion 14 of the motor 4 is fixed to the stationary drum 2 by closely fitting to the center hole 6 of the stationary drum 2. Meanwhile, the shaft portion 14 of the motor 4 is idly inserted through the center hole 9 of the rotary drum 3 by a bearing 8. Therefore, the rotary drum 3 can be rotated centering on the shaft portion 14 of the motor 4.

The motor main body section 13 of the motor 4 is composed of a coil 15 and a magnet 16. The coil 15 is mounted in a body with the shaft portion 14 and the magnet 16 is mounted to the side of the rotary drum 3. Here, because the shaft portion 14 which is fixed in a body with the coil 15 is fixed to the stationary drum 2, the rotary drum 3 to which the magnet 16 is attached is turned centering on the shaft portion 14 by the effect of electro-magnetic induction of the motor 4 when driving electric power is supplied to the motor main body section 13.

The magnetic head element 20 is attached to the rotary drum 3 composing the unit body 5. The magnetic head element 20 is attached to the rotary drum 3 via a piezoelectric ceramic 24, i.e., head projection regulating means, while being supported by a head supporting plate 23. Then, the magnetic head element 20 is disposed within the head storage section 11 of the rotary drum 3 so that the edge portion thereof faces to the outside via the window section 12 provided at the lower end part of the rotary drum 3. The magnetic head unit 1 of the present embodiment comprises a recording magnetic head element for writing signals to the magnetic tape T and a reproducing magnetic head element for reading signals written to the magnetic tape T as the magnetic head element 20. An inductive magnetic head element is used as the recording magnetic head element and a magneto-resistance effect type magnetic head element is used as the reproducing magnetic head element. Because the magneto-resistance effect type magnetic head element is characterized in that it brings about a relatively high reproduced output, the magneto-resistance effect type magnetic head element is used as the reproducing magnetic head element in the magnetic head unit 1 to improve the reproduced output. It is noted that the type and a number of the recording and reproducing magnetic head elements are not limited to those in this example and may be adequately changed as necessary.

Figure 4:
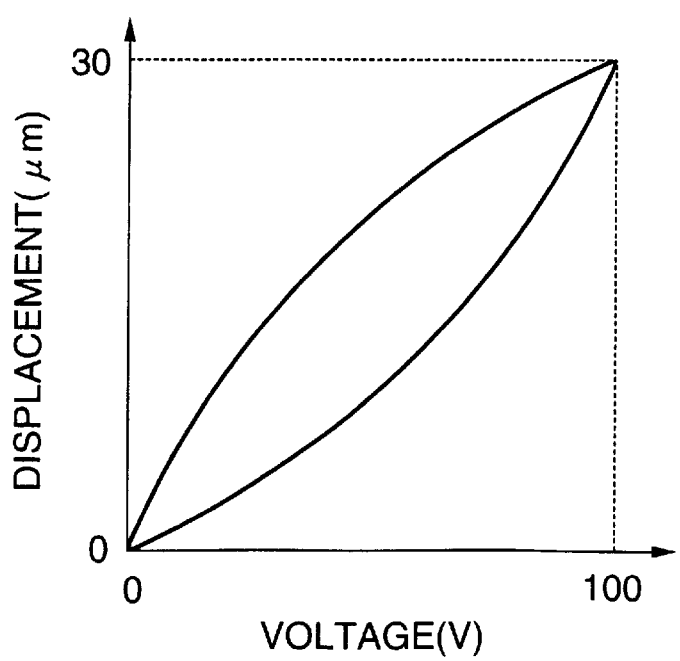
FIG. 4 is a graph showing the relationship between driving voltage and displacement of a piezoelectric ceramic composing head projection regulating means of the magnetic head unit.

The piezoelectric ceramic 24, i.e., the head projection regulating means, is formed into a shape of a plate by barium titanate ($BaTiO_3$) or zirconate titanate ($PbTiO$, $PbZrO_3$) for example. The piezoelectric ceramic 24 has a voltage/displacement characteristic as shown in FIG. 4 for example. That is, the piezoelectric ceramic 24 expands or contracts with a displacement of about 30 $\mu$m in maximum when voltage is applied by up to 100 V.

Figure 5A:
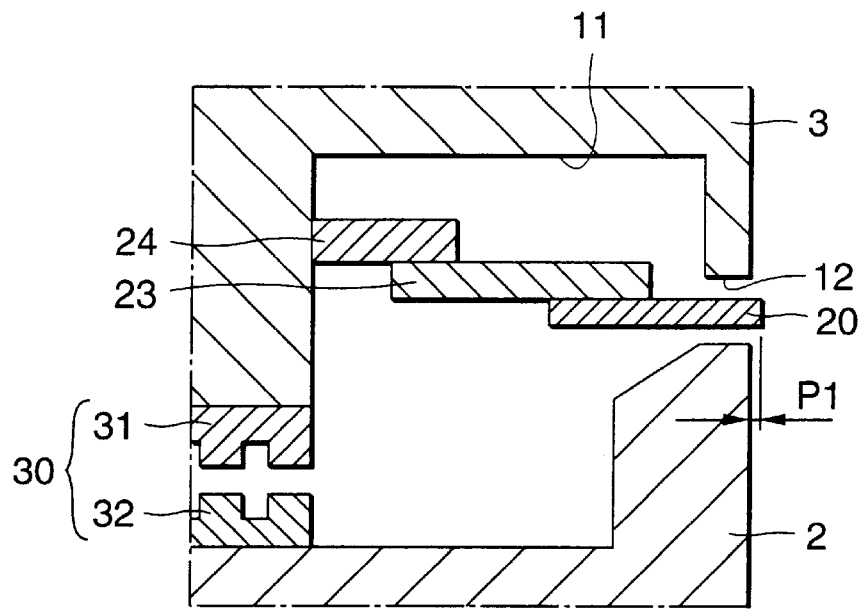
Figure 5B:
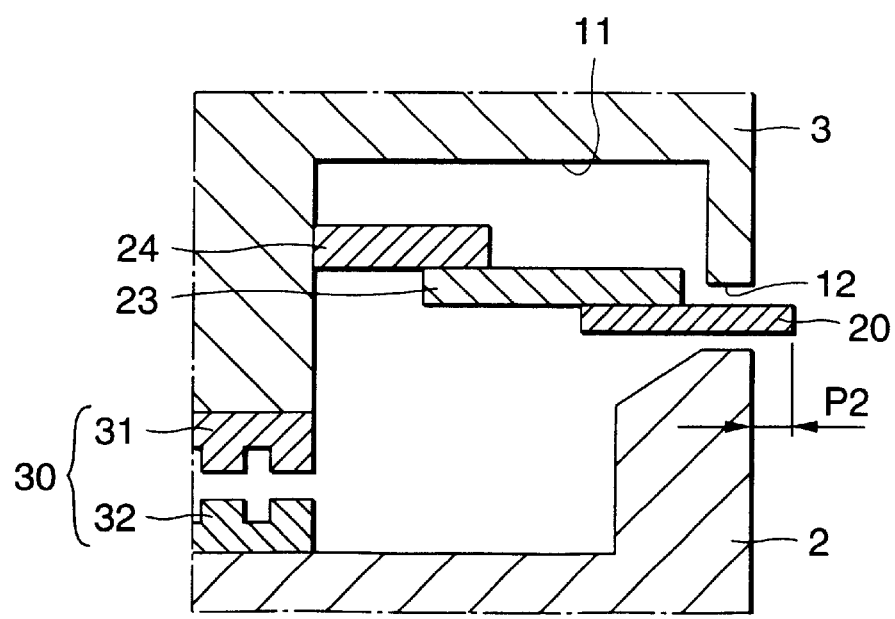
Figure 6:
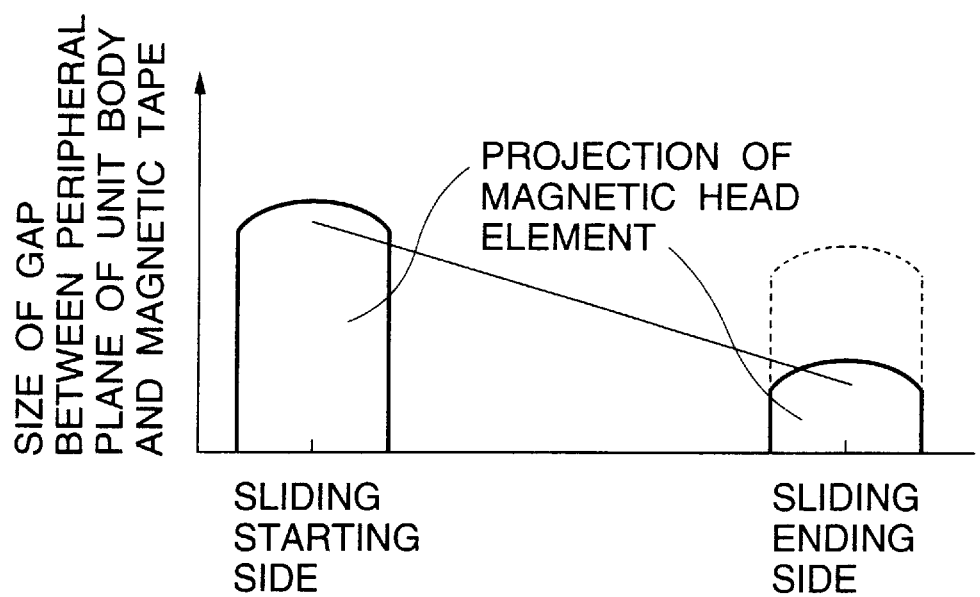
FIG. 6 is a graph showing the relationship between the size of a gap between the outer peripheral face of a unit body and a magnetic tape and the position of the magnetic tape.

The piezoelectric ceramic 24 is disposed within the head storage section 11 of the rotary drum 3 such that the basal end thereof is attached to the rotary drum 3. The piezoelectric ceramic 24 supports the head supporting plate 23 to which the magnetic head element 20 is mounted by its edge side. When voltage is applied to the piezoelectric ceramic 24, it expands toward the peripheral plane of the rotary drum 3 as shown in FIG. 5B for example. Thereby, the magnetic head element 20 supported by the piezoelectric ceramic 24 via the head supporting plate 23 moves toward the outside of the rotary drum 3 and the position of the edge portion changes from the first position P1 shown in FIG. 5A to the second position P2 shown in FIG. 5B. That is, a projection of the edge portion of the magnetic head element 20 out of the peripheral plane of the unit body 5 changes as voltage is applied to the piezoelectric ceramic 24 and the piezoelectric ceramic 24 is displaced.

The electric power for driving the piezoelectric ceramic 24, i.e., the head projection regulating means, is supplied from the stationary drum 2 side to the piezoelectric ceramic 24 attached to the rotary drum 3 via a rotary transformer 30 which is a non-contact type signal transmitter provided between the stationary drum 2 and the rotary drum 3.

The rotary transformer 30 transmits signals between the magnetic head element 20 disposed on the side of the rotary drum 3 and the side of the stationary drum 2 and has a rotor 31 and a stator 32 disposed so as to face to each other while having a small gap. The rotor 31 is disposed at the lower edge portion of the rotary drum 3 and is provided with a plurality of concentric ringed coils on the plane facing to the stator 32. The stator 32 is disposed at the upper edge portion of the stationary drum 2 and is provided with a plurality of concentric ringed coils on the place facing to the rotor 31. The rotary transformer 30 constructed as described above transmits signals between the rotor 31 and the stator 32 in non-contact by the electromagnetic effect. The magnetic head unit 1 electrically connects the magnetic head element 20 disposed on the side of the rotary drum 3 with the rotor 31 of the rotary transformer 30 to transmit a signal read from the magnetic tape T by the magnetic head element 20 to the stationary drum 2 via the rotary transformer 30 or to transmit a signal to be written to the magnetic tape T by the magnetic head element 20 from the side of the stationary drum 2 to the magnetic head element 20 via the rotary transformer 30.

In the magnetic head unit 1 of the present embodiment, the power for driving the piezoelectric ceramic 24, i.e., the head projection regulating means, is also transmitted by using the rotary transformer 30. That is, the magnetic head unit 1 is arranged so that the electric power for driving the piezoelectric ceramic 24 can be supplied from the side of the stationary drum 2 to the piezoelectric ceramic 24 attached to the rotary drum 3 via the rotary transformer 30 by electrically connecting the piezoelectric ceramic 24 to the rotor 31 of the rotary transformer 30.

It is noted that when the electric power for driving the piezoelectric ceramic 24, i.e., the head projection regulating means, is supplied to the piezoelectric ceramic 24 by using the rotary transformer 30 which also transmits signals between the magnetic head element 20 and the stationary drum 2, it is preferable to differentiate used frequency bands to avoid crosstalk between the signals transmitted between the magnetic head element 20 and the stationary drum 2 and the electric power for driving the piezoelectric ceramic 24. In the magnetic head unit 1 of the present embodiment, the signals to be transmitted between the magnetic head element 20 and the stationary drum 2 is transmitted with high frequency of 1 MHz to 20 MHz and the electric power for driving the piezoelectric ceramic 24 is transmitted with low frequency of 50 kHz to 100 kHz.

The magnetic head unit 1 constructed as described above is disposed within the helical scan method recording/reproducing apparatus. Then, the magnetic tape T which is guided by the tape running system and is run along the predetermined path within the recording/reproducing apparatus is wound around the peripheral planes of the stationary drum 2 and the rotary drum 3 as shown in FIGS. 1 and 2 with a winding angle of 180 degrees for example. At this time, the magnetic tape T is wound aslant around the peripheral plane of the unit body 5 by being wound along the tape guide groove 7 formed on the peripheral plane of the stationary drum 2.

The rotary drum 3 is turned in the state in which the magnetic tape T is wound around the peripheral plane of the unit body 5 in the magnetic head unit 1. Then, the magnetic head element 20 which is attached to the rotary drum 3 so that the edge portion faces to the outside from the peripheral plane of the unit body 5 moves along the peripheral plane of the unit body 5 and slides aslant on the recording face of the magnetic tape T wound around the peripheral plane of the unit body 5. Thereby, signals are written to the signal recording face of the magnetic tape T or signals are read from the recording face of the magnetic tape T where the signals have been written.

By the way, when the rotary drum 3 is turned, an air film caused by a flow of air as the rotary drum 3 is turned is created between the peripheral plane of the unit body 5 and the magnetic tape T wound around the peripheral plane of the unit body 5, thus creating a small gap between the peripheral plane of the unit body 5 and the magnetic tape T. Because this air film is generated by the flow of air caused by the rotation of the rotary drum 3, the size of the gap between the peripheral plane of the unit body 5 and the magnetic tape T differs depending on the ratio of portion of the magnetic tape T wound around the rotary drum 3.

Here, the magnetic tape T is wound aslant around the peripheral plane of the unit body 5 as described above. Then, it is wound more around the rotary drum 3 at the part indicated by A1 in FIG. 2 where it starts to be wound around the unit body 5, i.e., at the side where the magnetic head element 20 starts to slide with respect to the magnetic tape T. Meanwhile, the magnetic tape T is wound more to the stationary drum 2 at the part indicated by A2 in FIG. 2 where the winding around the unit body 5 ends, i.e., at the sliding ending side where the magnetic head element 20 ends to slide with respect to the magnetic tape T. Therefore, the gap created between the peripheral plane of the unit body 5 and the magnetic tape T increases as the tape heads to the sliding starting side and decreases as the tape heads to the sliding ending side.

When the projection of the edge portion of the magnetic head element 20 out of the peripheral plane of the unit body 5 is uniquely decided when the size of the gap created between the peripheral plane of the unit body 5 and the magnetic tape T changes depending on the position of the magnetic tape T on the peripheral plane of the unit body 5, the pressure of contact of the magnetic head element 20 to the magnetic tape T changes depending on the position of the magnetic head element 20, i.e., depending on whether the magnetic head element 20 is located at the sliding starting side or the sliding ending side, thus causing non-uniformity of touch.

Because the magnetic head element 20 is attached to the rotary drum 3 via the piezoelectric ceramic 24, i.e., the head projection regulating means, in the magnetic head unit 1 of the present embodiment, it is always possible to contact the magnetic head element 20 with the magnetic tape T with constant pressure of contact and to obtain uniform touch by displacing the piezoelectric ceramic 24 corresponding to the position of the magnetic head element 20 to regulate the projection of the edge portion of the magnetic head element 20 out of the peripheral plane of the unit body 5 so that it becomes large at the sliding starting side and small at the sliding ending side.

Figure 7:
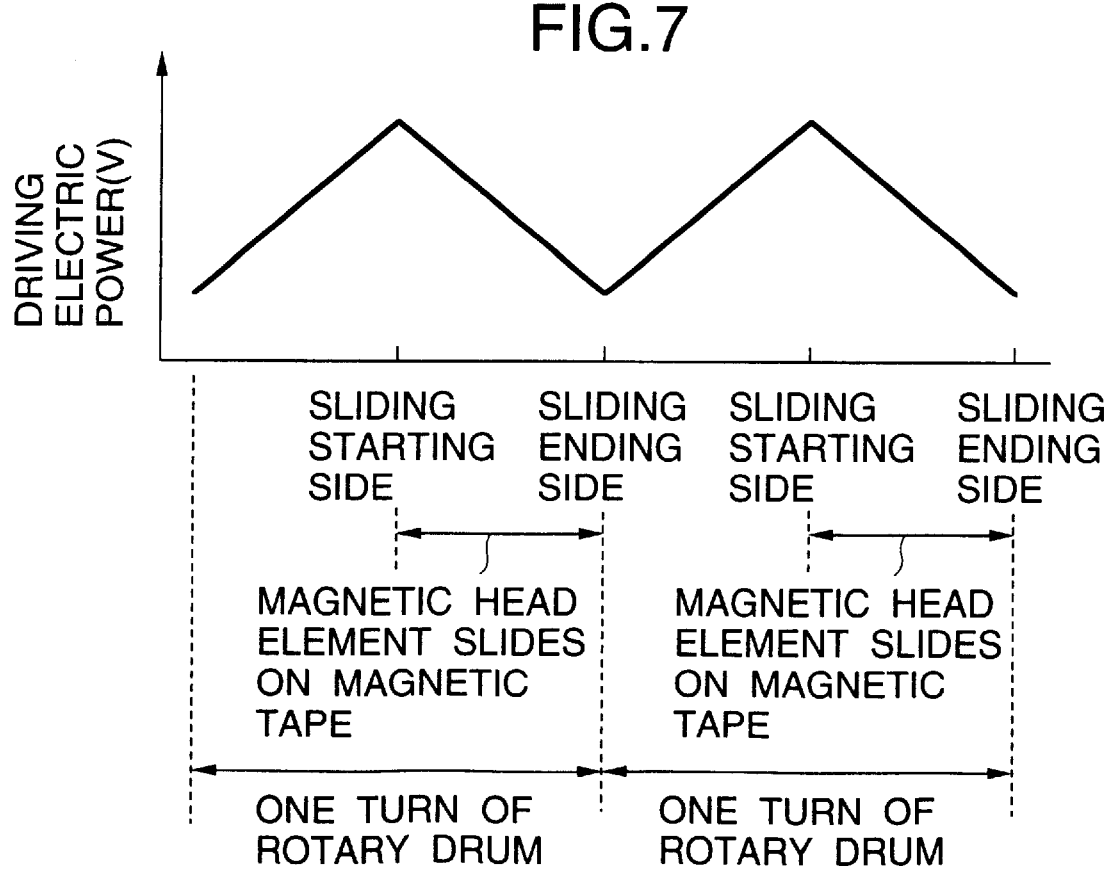
FIG. 7 shows one example of driving electric power to be supplied to the piezoelectric ceramic.

The piezoelectric ceramic 24 may be displaced so that the projection of the edge portion of the magnetic head element 20 out of the peripheral plane of the unit body 5 becomes large at the sliding starting side and small at the sliding ending side by driving the piezoelectric ceramic 24 by a triangular wave as shown in FIG. 7 in synchronism with the rotation of the rotary drum 3. The method for driving the piezoelectric ceramic 24 will be explained below.

Figure 8:
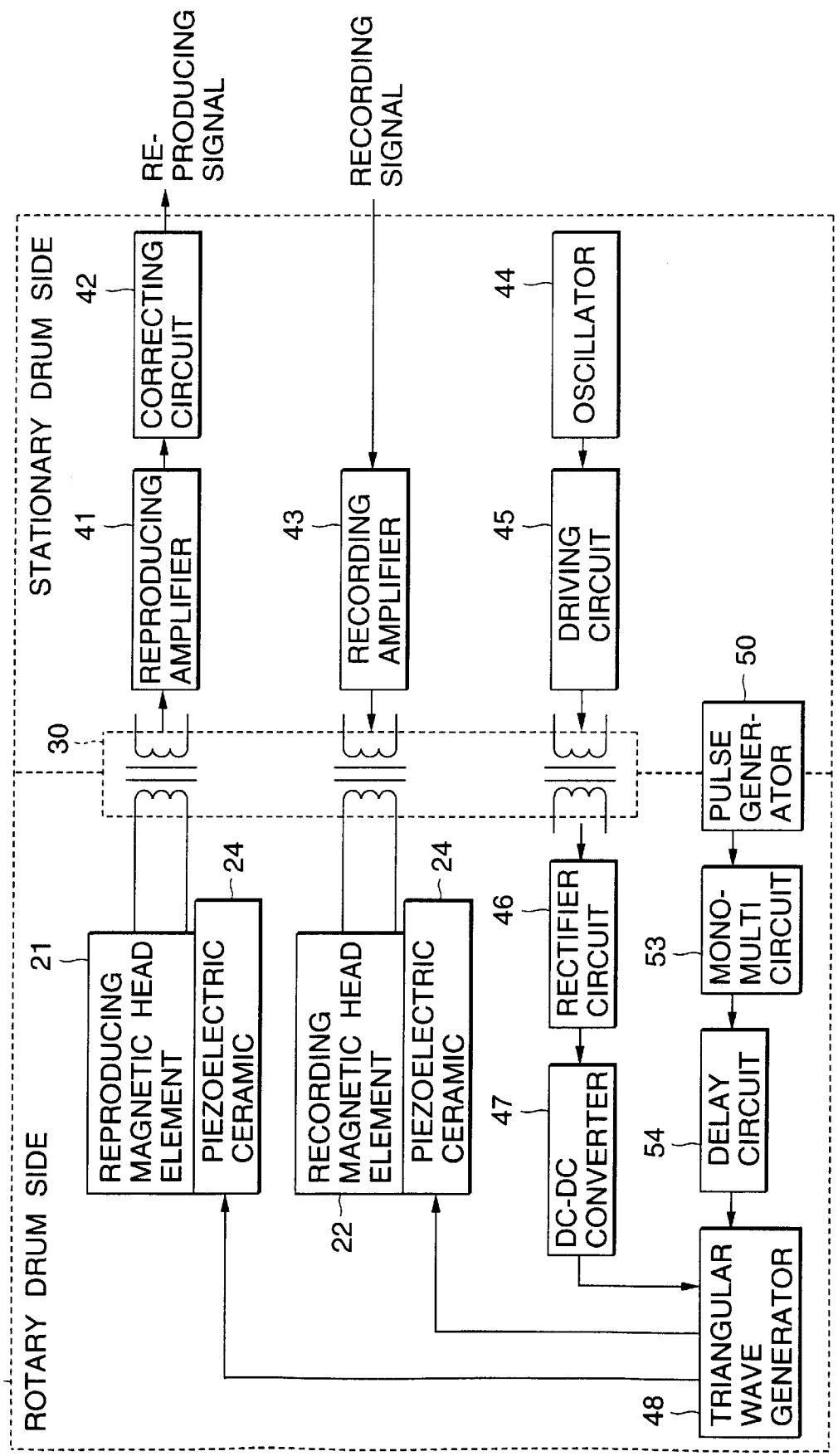
FIG. 8 is a block diagram showing the circuit structure of the magnetic head unit.

FIG. 8 shows the circuit structure of the magnetic head unit 1 of the present embodiment containing a driving circuit for driving the piezoelectric ceramic 24. As shown in FIG;. 8, the magnetic head unit 1 is arranged so as to transmit a reproduced signal read from the magnetic tape T by the reproducing magnetic head element 21 provided on the side of the rotary drum 3 to the side of the stationary drum 2 via the rotary transformer 30 and to supply the reproduced signal to an external signal processing circuit via a reproducing amplifier 41 and a correcting circuit 42. The magnetic head unit 1 is also arranged so as to transfer a recording signal supplied from the external signal processing circuit to a recording amplifier 43 on the stationary drum 2 side to the rotary drum 3 side via the rotary transformer 30 to write to the magnetic tape T by a recording magnetic head element 22 provided on the rotary drum 3.

The magnetic head unit 1 is also arranged so as to supply the driving electric power for driving the piezoelectric ceramic 24 to the piezoelectric ceramic 24 in the following manner. That is, AC power generated by an oscillator 44 on the stationary drum 2 side is transmitted to the rotary drum 3 side via the rotary transformer 30 after going through a driving circuit 45. The AC power transmitted to the rotary drum 3 slide is rectified by a rectifier circuit 46, is boosted to about 50 to 100 V by a DC-DC converter 47 and is then supplied to a triangular wave generator 48.

When the power is supplied to the triangular wave generator 48, the triangular wave generator 48 generates a triangular wave synchronized with the rotation of the rotary drum 3. This triangular wave is generated based on PG pulses from a pulse generator 50 provided between the stationary drum 2 and the rotary drum 3.

Figure 9:
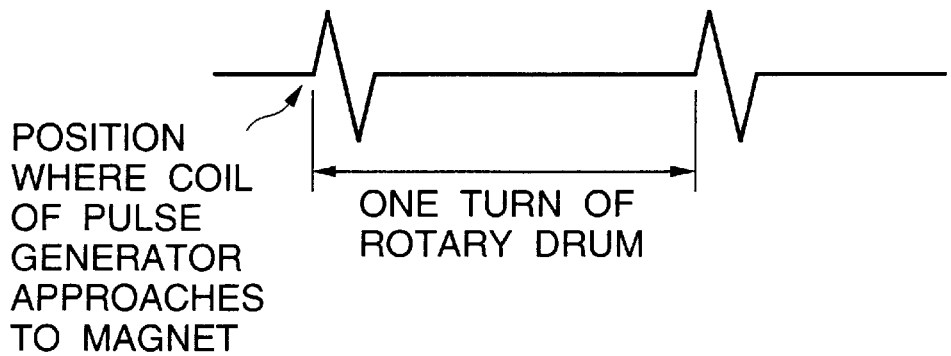
FIG. 9 is a chart showing PG pulses generated by a pulse generator of the magnetic head unit.

The pulse generator 50 detects the rotational cycle of the rotary drum 3 and is provided with a coil 51 disposed at the lower end portion of the rotary drum 3 and a magnet 52 disposed at the upper end portion of the stationary drum 2. Then, the pulse generator 50 generates the PG pulses as shown in FIG. 9 for example when the coil 51 approaches to the magnet 52 every time when the rotary drum 3 makes one turn.

Figure 10:
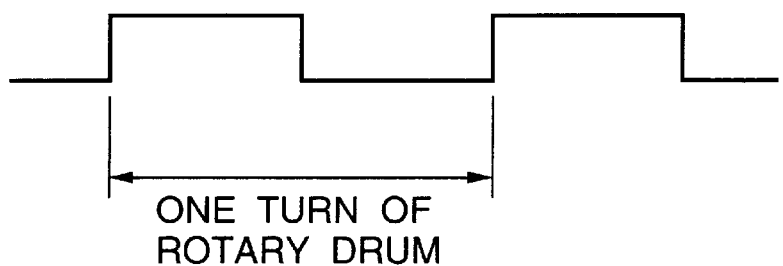
FIG. 10 is a chart showing a rectangular wave generated by a mono-multi circuit of the magnetic head unit.
Figure 11:
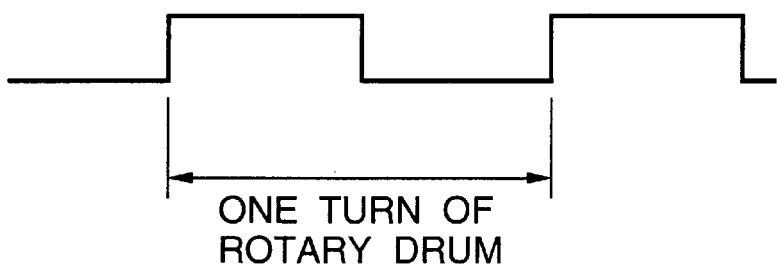
FIG. 11 is a chart showing a rectangular wave generated by a delay circuit of the magnetic head unit.
Figure 12:
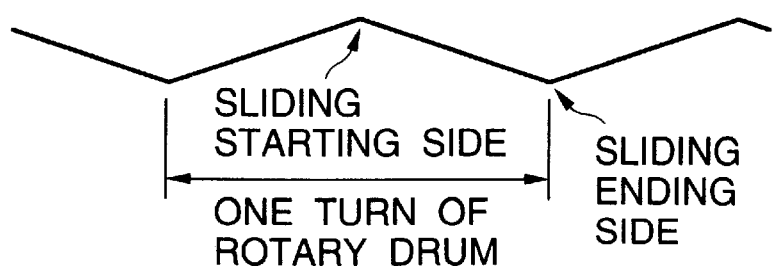
FIG. 12 is a chart showing a triangular wave generated by a triangular wave generator of the magnetic head unit.

The PG pulses from the pulse generator 50 is supplied to a mono-multi circuit 53 by which it is transformed into a rectangular wave whose one cycle is one rotation of the rotary drum 3 as shown in FIG. 10. The rectangular wave generated by the mono-multi circuit 53 is then supplied to a delay circuit 54. The delay circuit 54 sets the rectangular wave as shown in FIG. 11 where the phase of the wave is adjusted to the place where the magnetic tape T starts to be wound around the unit body 5, i.e., at the sliding starting side. This rectangular wave is then supplied to the triangular wave generator 48 and the triangular wave generator 48 generates the triangular wave synchronized with the rotation of the rotary drum 3 as shown in FIG. 12.

The triangular wave generated by the triangular wave generator 48 is supplied to the piezoelectric ceramic 24 supporting the reproducing magnetic head element 21 and to the piezoelectric ceramic 24 supporting the recording magnetic head element 22, respectively. Thereby, the piezoelectric ceramic 24 is displaced in synchronism with the rotation of the rotary drum 3 and along the displacement of the piezoelectric ceramic 24, the projection of the edge portion of the reproducing magnetic head element 21 and the recording magnetic head element 22 out of the peripheral plane of the unit body 5 changes so that it increases at the sliding starting side and decreases at the sliding ending side.

The magnetic head unit 1 to which the present invention is applied allows the reproducing magnetic head element 21 and the recording magnetic head element 22 to contact with the magnetic tape T always at constant contact pressure and uniform touch to be obtained by driving the piezoelectric ceramic 24, i.e., the head projection regulating means, as described above to change the projection of the edge portions of the reproducing magnetic head element 21 and the recording magnetic head element 22 out of the peripheral plane of the unit body 5 to be large at the sliding starting side and to be small at the sliding ending side. Accordingly, the magnetic head unit 1 can exhibit the good recording/reproducing characteristics while suppressing the damage of the magnetic tape T and the wear of the reproducing magnetic head element 21 and the recording magnetic head element 22 and suppressing the drop of output by the spacing loss.

In particular, the magneto-resistance effect type magnetic head element used as the reproducing magnetic head element 21 has had a problem that it is liable to wear while it allows a high reproduced output to be obtained, however, in the magnetic head unit 1 to which the present invention is applied, the reproducing magnetic head element 21 contacts with the magnetic tape T always at constant contact pressure and the contact pressure of the reproducing magnetic head element 21 to the magnetic tape T does not become too large, so that it can minimize the wear of the magneto-resistance effect type magnetic head element and can prolong the life of the reproducing magnetic head element 21.

Figure 13A:
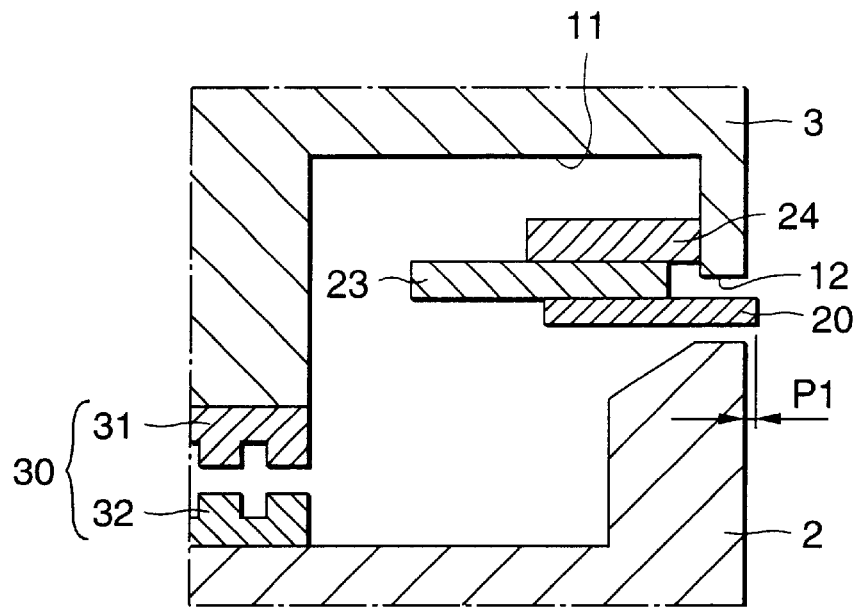
Figure 13B:
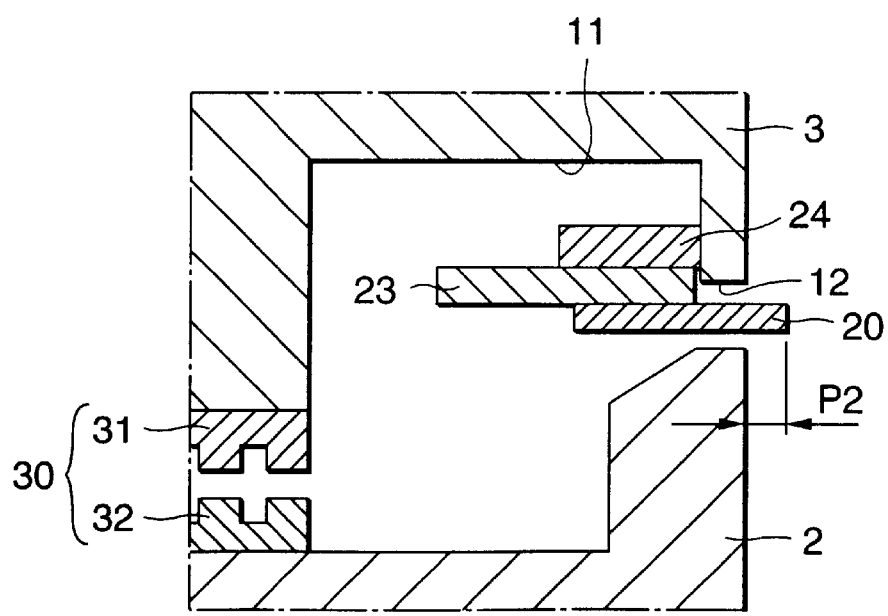

It is noted that although the case of attaching the piezoelectric ceramic 24, i.e., the head projection regulating means, to the rotary drum 3 so that it expands toward the outer peripheral side of the unit body 5 and of increasing the projection of the edge portion of the magnetic head element 20 out of the peripheral plane of the unit body 5 when the piezoelectric ceramic 24 expands and of decreasing the projection of the edge portion of the magnetic head element 20 out of the peripheral plane of the unit body 5 when the piezoelectric ceramic 24 contracts has been explained, the magnetic head unit 1 is not limited only to such case. For example, the magnetic head unit 1 may be constructed so that the piezoelectric ceramic 24 is attached to the rotary drum 3 so that it expands toward the inner peripheral side of the unit body 5 as shown in FIGS. 13A and 13B to decrease the projection of the edge portion of the magnetic head element 20 out of the peripheral plane of the unit body 5 when the piezoelectric ceramic 24 expands and to increase the projection of the edge portion of the magnetic head element 20 out of the peripheral plane of the unit body 5 when the piezoelectric ceramic 24 contracts.

In this case, the piezoelectric ceramic 24 is attached to the wall plane of the outer peripheral side among the.:wall planes composing the head storage section 11 of the rotary drum 3. Then, when the piezoelectric ceramic 24 expands, the edge portion of the magnetic head element 20 supported by the piezoelectric ceramic 24 via the head supporting plate 23 is located at the first position P1 as shown in FIG. 13A and is located at the second position P2 when the piezoelectric ceramic 24 contracts as shown in FIG. 13B.

In the magnetic head unit 1, centrifugal force caused by the rotation of the rotary drum 3 is applied in the direction of compressing the piezoelectric ceramic 24 when the piezoelectric ceramic 24 is attached to the rotary drum 3 so that it expands to the inner peripheral side of the unit body 5 as described above. Here, the piezoelectric ceramic 24 has a character that it is weak against force in the direction of pulling the piezoelectric ceramic 24 and is strong against force in the direction of compressing the piezoelectric ceramic 24. Accordingly, it is possible to effectively prevent the piezoelectric ceramic 24 from being damaged and to reliably regulate the projection of the magnetic head element 20 by attaching the piezoelectric ceramic 24 to the rotary drum 3 as described above in the magnetic head unit 1.

Figure 14:
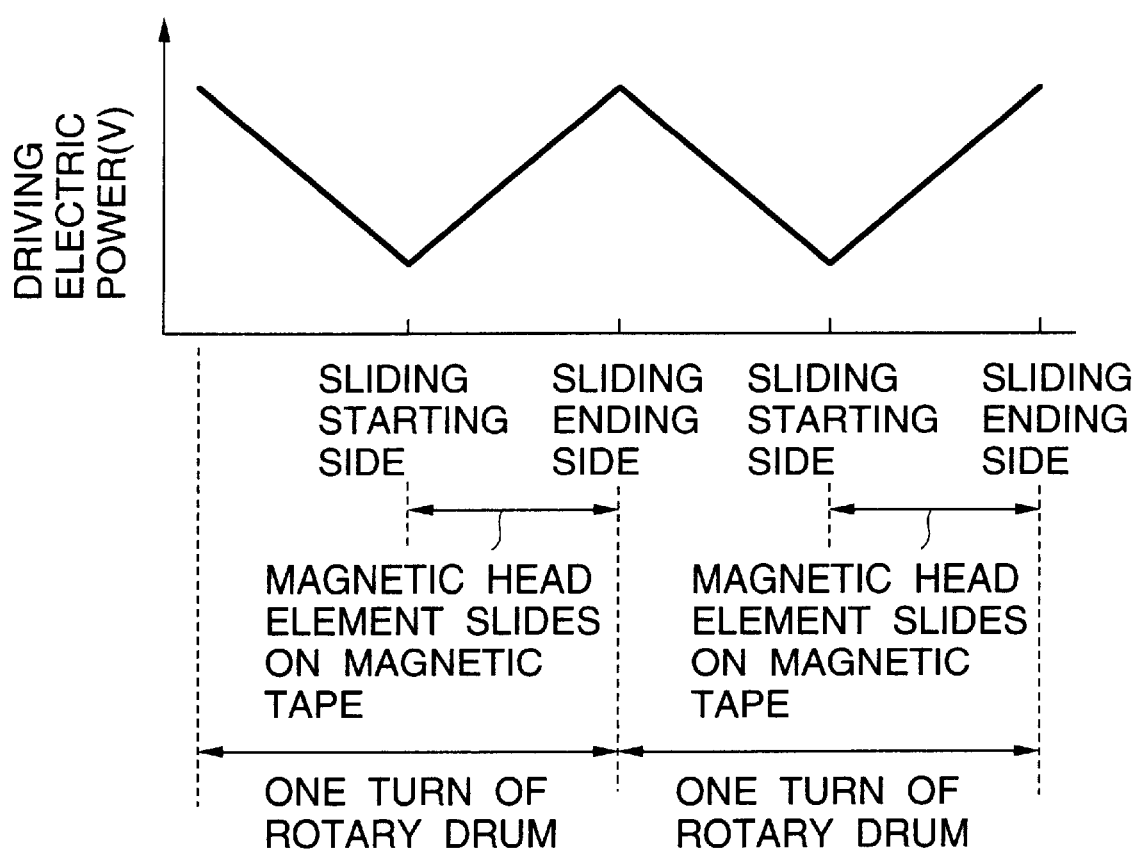
FIG. 14 is a chart showing one example of driving electric power to be supplied to the piezoelectric ceramic of the other magnetic head unit of the invention.

It is noted that in the cases described above, the projection of the edge portion of the magnetic head element 20 out of the peripheral plane of the unit body 5 becomes small when the piezoelectric ceramic 24 expands and the projection of the edge portion of the magnetic head element 20 out of the peripheral plane of the unit body 5 becomes large when the piezoelectric ceramic 24 contracts, so that the piezoelectric ceramic 24 may be displaced such that the projection of the edge portion of the magnetic head element 20 out of the peripheral plane of the unit body 5 becomes large at the sliding starting side and small at the sliding ending side by driving the piezoelectric ceramic 24 by the triangular wave as shown in FIG. 14.

Further, although the cases of composing the head projection regulating means by the piezoelectric ceramic 24 which is attached to the rotary drum 3 and supporting the magnetic head element 20 via the head supporting plate 23 have been explained above, the inventive magnetic head unit is not limited to those cases. For example, the head projection regulating means may be composed of another item which can change the projection of the edge portion of the magnetic head element 20. In concrete, an electromagnetic induction type actuator and the like used in tracking control and focusing control in an optical head unit and the like may be applied.

Further, although the cases of driving the piezoelectric ceramic 24, i.e., the head projection regulating means, so that the projection of the edge portion of the magnetic head element 20 out of the peripheral plane of the unit body 5 differs at the sliding starting side where the magnetic head element 20 starts to slide with respect to the magnetic tape T running along the peripheral plane of the unit body 5, and at the sliding ending side where the magnetic head element 20 ends to slide with respect to the magnetic tape T have been explained, the head projection regulating means may be driven so that the projection of the edge portion of the magnetic head element 20 out of the peripheral plane of the unit body 5 changes corresponding to the conditions of the magnetic head element 20 and the magnetic tape T in the inventive magnetic head unit.

In concrete, when the wear of the magnetic head element 20 advances, the head projection regulating means may be driven so as to change the projection of the edge portion in correspondence to the wear of the magnetic head element 20 in the inventive magnetic head unit. Thereby, it is possible to keep the touch of the magnetic head element 20 to the magnetic tape T constant and to exhibit the good recording/reproducing characteristics even when the wear of the magnetic head element 20 has advanced.

Because the inventive magnetic head unit comprises the head projection regulating means and is arranged so that the head projection regulating means can change the projection of the edge portion of the magnetic head element out of the peripheral plane of the unit body 5, it can keep the touch of the magnetic head element to the magnetic tape always at the good condition, can suppress the damage of the magnetic tape and the wear of the magnetic head element and can exhibit the good recording/reproducing characteristics, by changing the projection of the edge portion of the magnetic head element out of the peripheral plane of the unit body corresponding to the fluctuation of the distance between the magnetic tape and the peripheral plane of the unit body, for example.

Further, according to the inventive method for writing or reading signals, the signals are written/read to/from the magnetic tape while changing the projection of the edge portion of the magnetic head element out of the peripheral plane of the magnetic head unit in synchronism with the rotation of the rotary drum, so that the touch of the magnetic head element to the magnetic tape may be always kept at the good condition, the damage of the magnetic tape and the wear of the magnetic head element may be effectively suppressed and the signals may be written/read adequately to/from the magnetic tape, even when the distance between the magnetic tape and the peripheral plane of the unit body fluctuates due to the rotation of the rotary drum, for example.

While the preferred embodiments have been described, variations thereto will occur to those skilled in the art within the scope of the present inventive concepts which are delineated by the following claims.

What is claimed is:

1. A magnetic head unit, comprising:

an approximately cylindrical unit body comprising:
   a stationary drum; and
   a rotary drum rotatable with respect to said stationary drum;
a magnetic head element in said rotary drum in which an edge portion thereof is disposed on a rotary drum side so as to face outside from a peripheral plane of said unit body; and
a head projection regulating means for varying a projection of said edge portion of said magnetic head element from said peripheral plane of said unit body, wherein said head projection regulating means varies the projection of said edge portion of said magnetic head element synchronously with rotation of said rotary drum so that the projection of said edge portion of said magnetic head element differs at a sliding starting side where said magnetic head element starts sliding with respect to a magnetic tape which runs along said peripheral plane of said unit body from a sliding ending side where said magnetic head element ends sliding with respect to the magnetic tape, and wherein
   a non-contact type signal transmitter for transmitting a signal between said magnetic head element disposed on said rotary drum side and a stationary drum side is provided between said stationary drum and said rotary drum, and wherein
   driving electric power for driving said head projection regulating means is transmitted as an alternating current via said non-contact type signal transmitter, and wherein
   a frequency of said signal is higher than a frequency of electric power to said head projection regulating means.

2. The magnetic head unit of claim 1, wherein said frequency of said signal is about 1 MHZ to about 20 MHZ, and said frequency of said electric power to said head projection regulating means is about 50 KHz to about 100 KHz.

3. The magnetic head unit of claim 1, wherein said head projection regulating means comprises a piezoelectric ceramic provided between said rotary drum and said magnetic head element.

4. The magnetic head unit of claim 1, wherein said magnetic head element is a magneto-resistance effect type magnetic head element.

5. A method for writing or reading signals to/from a magnetic tape by sliding on said magnetic tape a magnetic head element whose edge portion is disposed on a side of a rotary drum so as to face outside from a peripheral plane of an approximately cylindrical magnetic head unit by running said magnetic tape along said peripheral plane of said magnetic head element having a stationary drum and the rotary drum rotatable with respect to said stationary drum and by rotating said rotary drum, wherein signals are written/read to/from said magnetic head element while changing a projection of the edge portion of said magnetic head element from said peripheral plane of said magnetic head unit synchronously with the rotation of said rotary drum, and wherein said projection of said edge portion of said magnetic head element is varied synchronously with the rotation of said rotary drum so that the projection of said edge portion of said magnetic head element differs at the sliding starting side where said magnetic head element starts sliding with respect to said magnetic tape and at the sliding ending side where said magnetic head element ends sliding with respect to said magnetic tape, and wherein driving electric power for changing the projection of said edge portion of said magnetic head element is transmitted as an alternating current via a non-contact type signal transmitter for transmitting a signal between said magnetic head element disposed on said rotary drum side of said magnetic head unit and a stationary drum side, and wherein a frequency of said signal is higher than a frequency of said driving electric power for varying the projection of said edge portion of said magnetic head element.

6. The method of claim 5, wherein a piezoelectric ceramic is provided between said rotary drum and said magnetic head element to change the projection of the edge portion of said magnetic head element out of said peripheral plane of said magnetic head unit by driving the piezoelectric ceramic with said driving electric power.

7. The method of claim 5, wherein a magneto-resistance effect type magnetic head element is used as said magnetic head element.

8. The method of claim 5, wherein said frequency of said signal is about 1 MHZ to about 20 MHZ, and said frequency of said driving electric power is about 50 KHz to about 100 KHz.

* * * * *